United States Patent [19]

Hori et al.

[11] Patent Number: 4,972,627
[45] Date of Patent: Nov. 27, 1990

[54] SHEET MATERIAL FOR USE IN CULTIVATING PLANTS

[75] Inventors: Kazuo Hori; Haruo Yamamoto, both of Hyogo, Japan

[73] Assignee: Bussan G. & A. Co., Ltd., Tokyo, Japan

[21] Appl. No.: 368,174

[22] Filed: Jun. 19, 1989

[30] Foreign Application Priority Data

Dec. 19, 1987 [JP] Japan ................. 62-192899

[51] Int. Cl.$^5$ .................................. A01G 31/00
[52] U.S. Cl. ..................... 47/64; 47/5.5; 47/15; 47/84; 47/41.01; 47/DIG. 3; 206/423
[58] Field of Search ............ 47/41.01, 41.12, 59, 47/64, 74, 67, 15, DIG. 3, 5.5, 15, 84; 206/423

[56] References Cited

U.S. PATENT DOCUMENTS

| | | | |
|---|---|---|---|
| 1,873,666 | 4/1932 | Roy | 47/41.01 |
| 1,882,713 | 10/1932 | Angier | 47/9 |
| 2,243,857 | 6/1941 | Fischer | 47/9 |
| 2,766,553 | 10/1956 | Wedge | 206/423 |
| 2,904,932 | 9/1959 | Seewann | 47/41.01 |
| 3,657,840 | 4/1972 | Benoist | 47/41.01 |
| 3,870,583 | 3/1975 | Gidge | 47/9 |
| 4,175,355 | 11/1979 | Dedolph | 47/64 |
| 4,342,807 | 8/1982 | Rasen | 47/9 |
| 4,789,584 | 12/1988 | Perrin | 47/41.12 |

FOREIGN PATENT DOCUMENTS

| | | | |
|---|---|---|---|
| 2344935 | 4/1974 | Fed. Rep. of Germany | 47/87 |
| 7014511 | 4/1971 | Netherlands | 47/64 |

*Primary Examiner*—Henry E. Raduazo
*Attorney, Agent, or Firm*—Wegner, Cantor, Mueller and Player

[57] ABSTRACT

A sheet material (4) for use in cultivating plants comprising a body having a coilable flexible, fluid-permeable structure and a plurality of passages (7,9) formed in and extending from one surface (3) to the another (5) of said body. The passages serve to induce root tips to grow and contain fertilizers. The body has at least one surface formed with projections and/or recesses. Preferably, the surface having projections and/or is provided with a ceramic powder discharging infrared rays of wavelength in the range of about 5 to 15 micrometers, a elution-rate controlling growth regulation fertilizer and a small amount of a chosen element. In use, a given length of the sheet material is wrapped around the plant.

4 Claims, 9 Drawing Sheets

SHEET MATERIAL FOR USE IN CULTIVATING PLANTS

The present invention relates to a sheet material for use in the cultivation of plants.

Soil is the normal medium for the cultivation of plants. Since planting and transplanting are sometimes carried out manually, this can lead to high labour costs. Furthermore, when soil is used as a growth medium, several related problems such as insect infestations may occur.

The object of the present invention is thus to provide a substitute for soil for use in the cultivation of plants.

According to one aspect of the present invention there is provided a coilable sheet material for use in cultivating plants, which material comprises a body of fluid permeable, compressable material having a plurality of through holes formed in and extending from one surface to another, said body having at least one surface having projections and/or recesses formed thereon.

According to a second aspect of the invention, there is provided a method of cultivating a plant wherein a sheet material envelopes the stem and root system of a seedling and contains cultivation medium for the plant.

For a better understanding of the invention and to show how the same may be carried into effect, reference will now be made, by way of example, to the accompanying drawings where:

Figure 1:
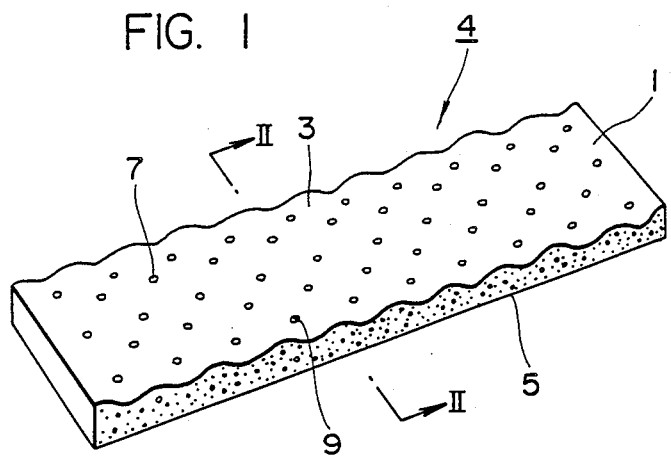
FIG. 1 is a perspective view of a sheet material according to one embodiment of the present invention.
Figure 2:
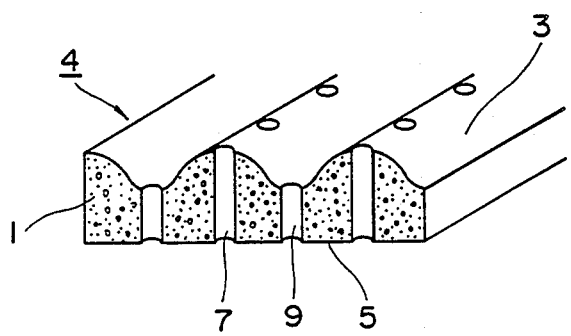
FIG. 2 is a sectional view of the sheet material of FIG. 1 taken along line II—II.

Referring to FIGS. 1 and 2, the sheet material 4 has a fluid permeable structure 1, here shown as a foam plastics structure. In general, the sheet material may be formed from a fibrous material such as metal fibres, wood pulp, plastics fibres, a foam material such as polyurethane foam, or a woven or non-woven web structure formed for example from asbestos, glass or bamboo fibres. Plastics foam has been found to be a most suitable material due to its porous structure, flexibility and high gas permeability as well as good water retention characteristics. It is desirable that at least one of the larger surfaces is provided with a plurality of projections and/or recesses so as to create gaps when the sheet material is in use i.e. rolled-up. One of the larger surfaces 3 of the sheet material therefore, preferably has an undulating surface. A plurality of passages extends through the material from surface 3 to opposite surface 5. Some of the passages 7 serve to induce the growth of root tips which can thus easily spread through the sheet whilst other passages 9 can contain various fertilizers.

Figure 3:
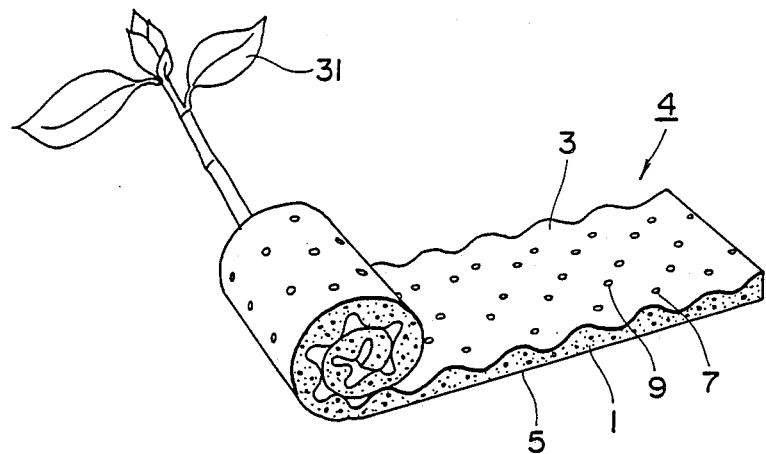
FIG. 3 shows a plant being rolled up in the sheet material of FIG. 1.
Figure 4:
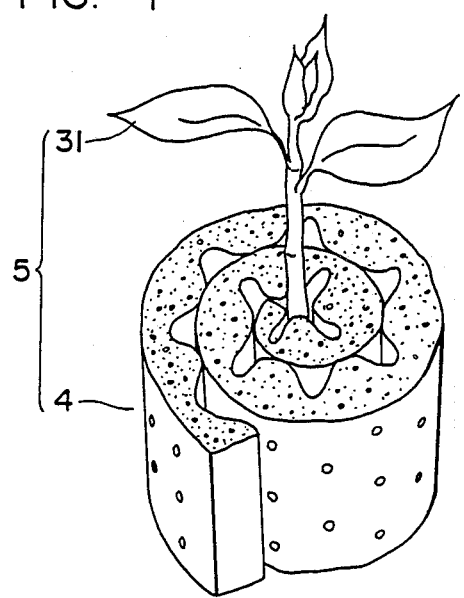
FIG. 4 is a perspective view of the sheet material rolled up around a plant.

FIGS. 3 and 4 show how the sheet material 4 may be used for transplantation. A plant 31 is placed on the undulating surface 3 and the sheet material is then rolled up as shown in the Figures. The combined assembly 5 of the plant 31 and the sheet material 4 can then be inserted into a suitable container. The use of the above method is easier than that of using a conventional media such as a culture soil or a water retaining material and requires no specific skills. A further advantage is that the assembly is lighter and hence more portable than transplanting cultures previously used.

The above described method can also be used for growth of plant cuttings. As the use of soil is avoided, problems caused by insects and harmful bacteria infestations are avoided. In addition, growth encouraging substances can be placed in the perforations 9 of the sheet material.

Figure 5:
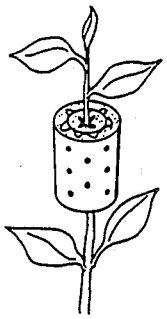
FIG. 5 illustrates the use of the sheet material in layering and grafting.

FIG. 5 shows how the sheet material can be used in the technique of layering i.e. encouraging plants to strike roots and propagate at points other than at the roots themselves. The conventional method involves using for example, clay and is more complicated than using the sheet material 4.

Figure 6:
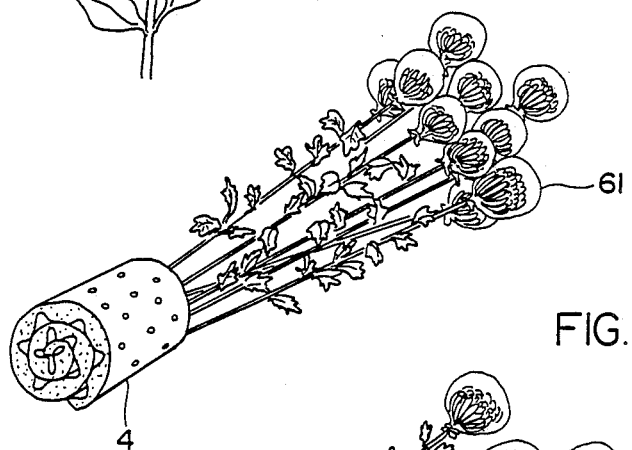
FIG. 6 illustrates the use of the sheet material in the transportation of plants.
Figure 7:
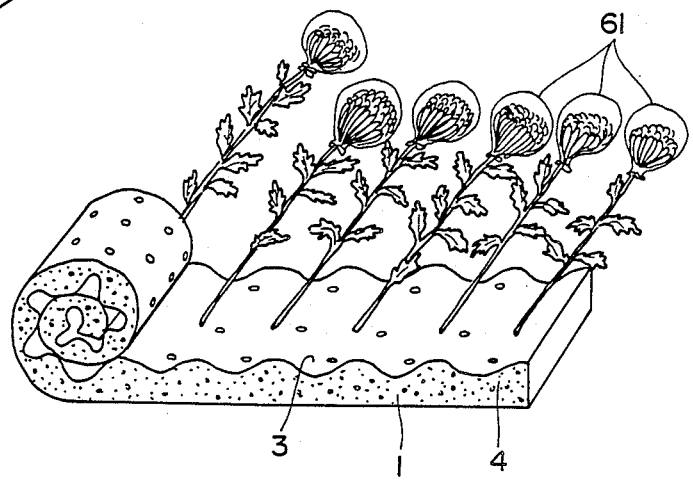
FIG. 7 illustrates plants being prepared for transportation.

FIGS. 6 and 7 show how the sheet material 4 may be used in the transportation of stemmed flowers 61 with a minimum of damage. The flowers 61 are placed at spaced intervals corresponding to the undulations along surface 3 of the sheet material which has taken up water in its pores. The sheet material 4 is then rolled up keeping the cut ends of the flowers 61 supplied with water for prolonged periods of time. Since the sponge-like structure allows for high gas permeability, ethene gas which is discharged from the cut ends of the flowers can readily escape.

Figure 8:
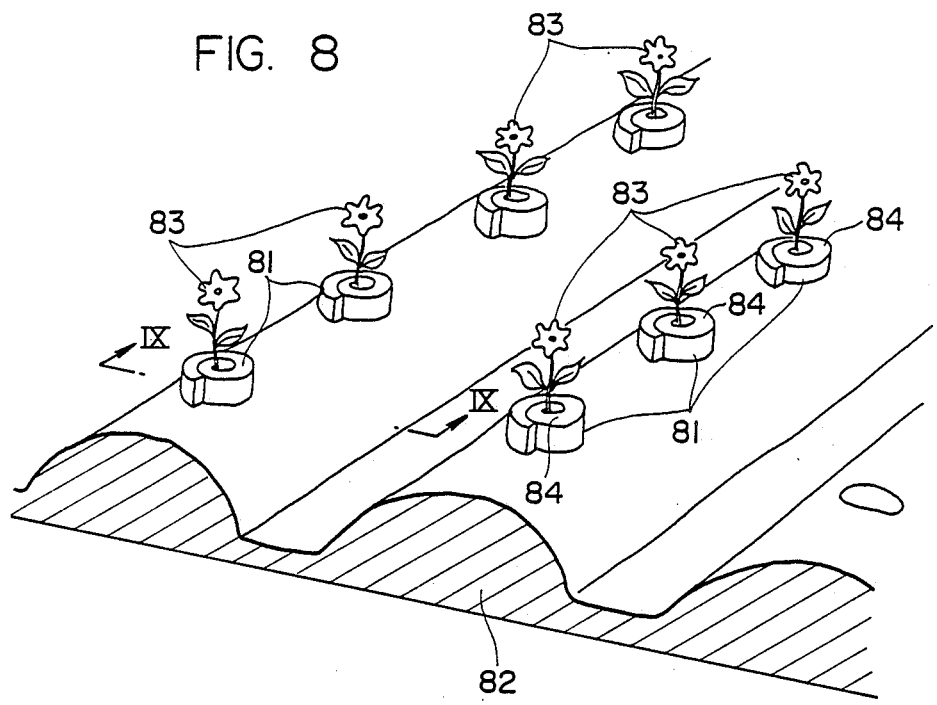
FIG. 8 is a perspective view use showing the use of the sheet material of FIG. 1 in transplanting to a ploughed field.
Figure 9:
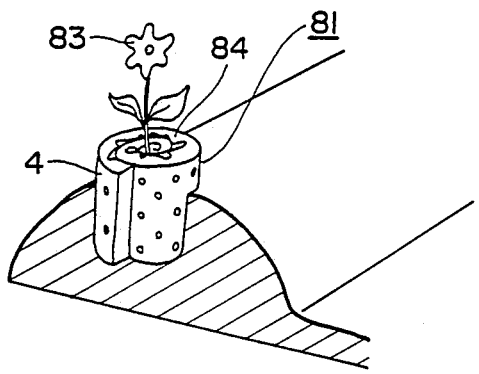
FIG. 9 is a sectional view taken along the line IX—IX in FIG. 8.

FIGS. 8 and 9 show the sheet material 4 in use for transplanting plants in a ploughed field. An assembly 81 of the plant 83 each enveloped in sheet material 4 is inserted into ground 82 such that the upper half of the sheet material 4 is left exposed above the ground. Since the roots of the plants are enclosed, they are protected from harmful insects such as armyworms. The leaves are located above the ground surface and are thus problems caused by mud covering the leaves are avoided. In addition the sheet material 4 protects the plant from changes in temperature of the environment as well as damage caused by pressure from the surrounding soil. The upper end 84 of the rolled structure can have a suitable pattern such as an eye which has the effect of deterring harmful birds such as bulbuls from damaging the plants.

Figure 10:
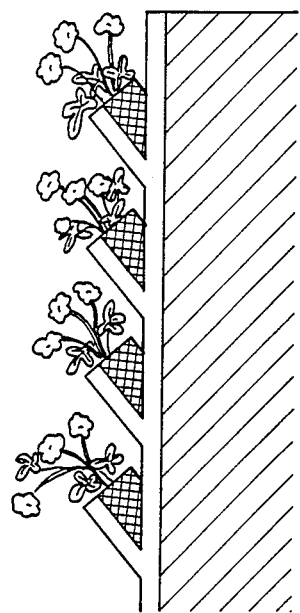
FIG. 10 illustrates a stacked flower bed produced using the sheet material of FIG. 1.
Figure 11:
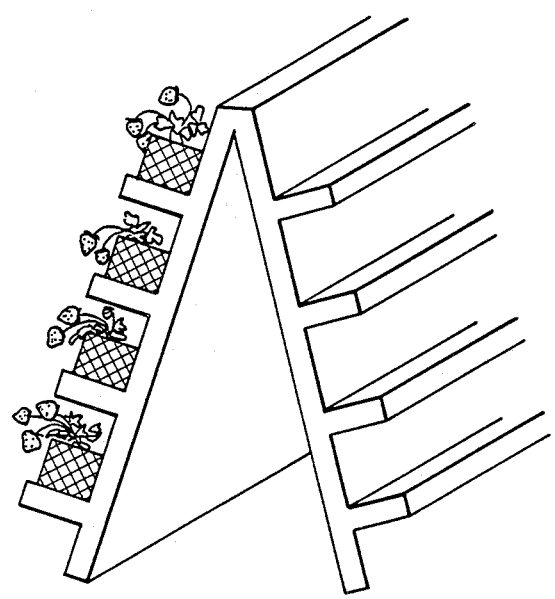
FIG. 11 illustrates strawberry cultivation using the sheet material of FIG. 1.

The sheet material has further applications such as in stacked flower beds against a wall or in the cultivation of strawberries as shown in FIGS. 10 and 11 respectively.

Figure 12:
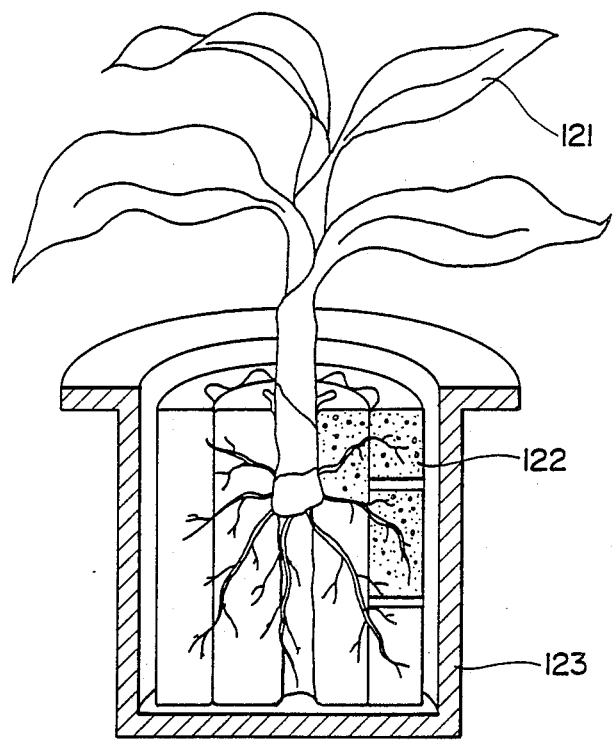
FIG. 12 illustrates hydroponic plant growth using the sheet material of FIG. 1.

As shown in FIG. 12, the sheet material can also be used in water cultivation (hydroponics). In this use, a plant 121 is rolled up in the sheet material as before and inserted into a water tight container 123. The assembly can be easily cleaned as well as allowing the free exchange of ions. These are both advantages over hydroballs conventionally protecting root systems.

Figure 13:
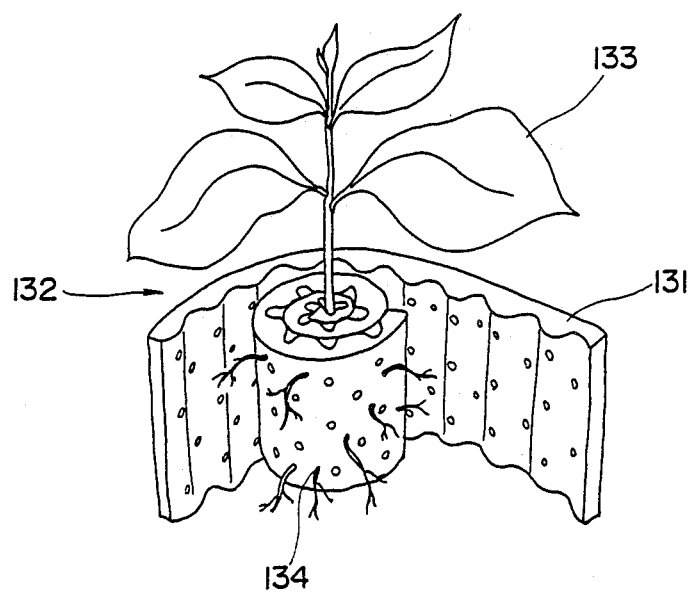
FIG. 13 illustrates the use of the sheet material of FIG. 1 in transplantation.

FIG. 13 shows how a plant already growing in a sheet material 4 can be transplanted to a larger container by wrapping another layer 131 of the sheet material around the assembly 132 such that the outer diameter of the assembly 132 becomes the same as the inner diameter of the larger container.

Figure 14:
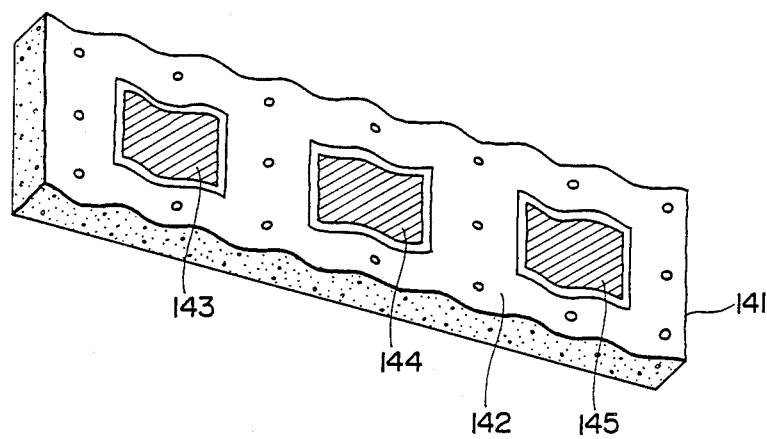
FIG. 14 shows sheet material according to another embodiment of the present invention.

FIG. 14 illustrates another embodiment of the present invention wherein a sheet material 141 has a surface 142, which is again undulating. Various regions of the undulating surface of the sheet are coated with a ceramic powder which is a source of infra-red rays. Typical wavelengths of the discharged infra-red rays range from 5 micrometers to about 15 micrometers. An example of the composition of the ceramic powder would be: $SiO_2$ 53.5% (Wt%); $Al_2O_3$ 34.6; $Fe_2O_3$ 5.38; $TiO_2$ 1.58; CaO 2.17; MgO 0.40; $K_2O$ 0.43; $Na_2O$ 0.14; MnO 0.04; $P_2O_5$ 1.28 and $V_2O_5$ 0.04.

Also located on the same surface of the sheet at different regions to the ceramic powder are regions containing a fertilizer to encourage the growth rate of the plant to be cultivated. For this purpose, the elution rate of the fertilizer is pre-adjusted depending on the growth rate of the plants so as to ensure a continuous supply of fertilizer during cultivation. An example of such a fertilizer is "High Control A180" as produced by CHISSO ASAHI HIRYO KABUSHIKIKAISHA.

Additionally, at yet another different location on the same surface of the sheet material is found a small amount of at least one element selected from:

| Li | Na | K | Rb | Mg | Ca | Ba | Al | Si | Ge | P |
|----|----|----|----|----|----|----|----|----|----|----|
| Se | Ti | B | Mn | Fe | Co | Ni | Cu | Zn | Mo | W. |

The different substances i.e. the fertilizer, ceramic powder and chosen element/s are all positioned on the sheet so as not to make contact with one another and are positioned in a line along the sheet.

Figure 15:
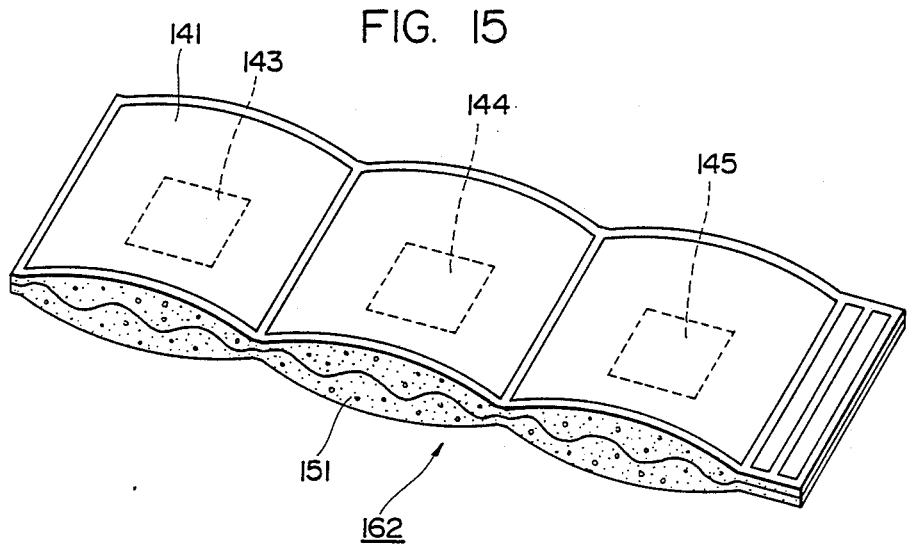
FIG. 15 illustrates a composite sheet material based on that shown in FIG. 14; and, FIG. 16 illustrates hydroponic cultivation using a composite sheet material shown in FIG. 15.
Figure 16:
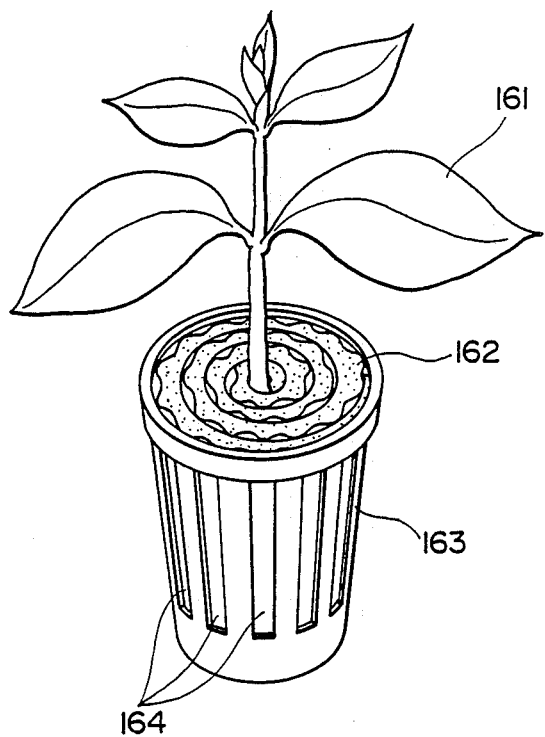

In another embodiment of the invention, a sheet as shown in FIG. 1 is combined with a sheet as shown in FIG. 14 to provide a composite sheet as shown in FIG. 15. The sheets are placed so that the undulating surfaces are in contact. As shown in FIG. 16 a plant is wrapped up in a composite sheet and is inserted in a flower pot 163 having water admission slots 164 extending downwards from the upper edge thereof. Thus the plants are sterilized and given sufficient nutrition by the provision of substances from the aforementioned three types of substance.

We claim:

1. A coilable sheet material for use in cultivating plants, which sheet material comprises a body of fluid-permeable compressible material having a plurality of through holes formed in and extending from one surface of the material to another, said body having at least one undulating surface which comprises first, second and third coating regions spaced apart from one another, said first coating region comprising a ceramic powder which absorbs infrared rays in the wavelength range of 5 to 15 micrometers, said second coating region comprising at least one element selected from the group consisting of Li, Na, K, Rb, Mg, Ca, Ba, Al, Si, Ge, P, Se, Ti, B, Mn, Fe, Co, Ni, Cu, Zn, Mo and W, and said third coating region comprising an elution rate controlling growth regulation fertilizer.

2. A coilable composite sheet material for use in cultivating plants, comprising first and second sheet materials which are superposed to form a single composite sheet, wherein each of the first and second sheet materials comprises a body of fluid-permeable compressible material having a plurality of through holes formed in and extending from one surface of the material to another, said body having at least one undulating surface which comprises first, second and third coating regions spaced apart from one another, said first coating region comprising a ceramic powder which absorbs infrared rays in the wavelength range of 5 to 15 micrometers, said second coating region comprising at least one element selected from the group consisting of Li, Na, K, Rb, Mg, Ca, Ba, Al, Si, Ge, P, Se, Ti, B, Mn, Fe, Co, Ni, Cu, Zn, Mo and W, and said third coating region comprising an elution rate controlling growth regulation fertilizer.

3. The coilable composite sheet material of claim 2, wherein the first and second sheet materials are superposed so that their respective undulating surfaces engage with each other.

4. A sheet material as claimed in claim 1, 2 or 3 wherein the ceramic powder consists of $SiO_2$ 53.5 (wt. %); $Al_2O_3$ 34.6; $Fe_2O_3$ 5.38; $TiO_2$ 1.58; CaO 2.17; MgO 0.04; $K_2O$ 0.03; $Na_2O$ 0.14; MnO 0.04; $P_2O_5$ 1.28 and $V_2O_5$ 0.04.

* * * * *